Nov. 7, 1967          A. Y. DODGE          3,350,961
                   LOCKING DIFFERENTIAL
Filed Aug. 9, 1965                        3 Sheets-Sheet 1

Inventor
Adiel Y. Dodge
By
McCanna, Morsbach & Pillote
Attorneys

Nov. 7, 1967  A. Y. DODGE  3,350,961
LOCKING DIFFERENTIAL
Filed Aug. 9, 1965 3 Sheets-Sheet 2
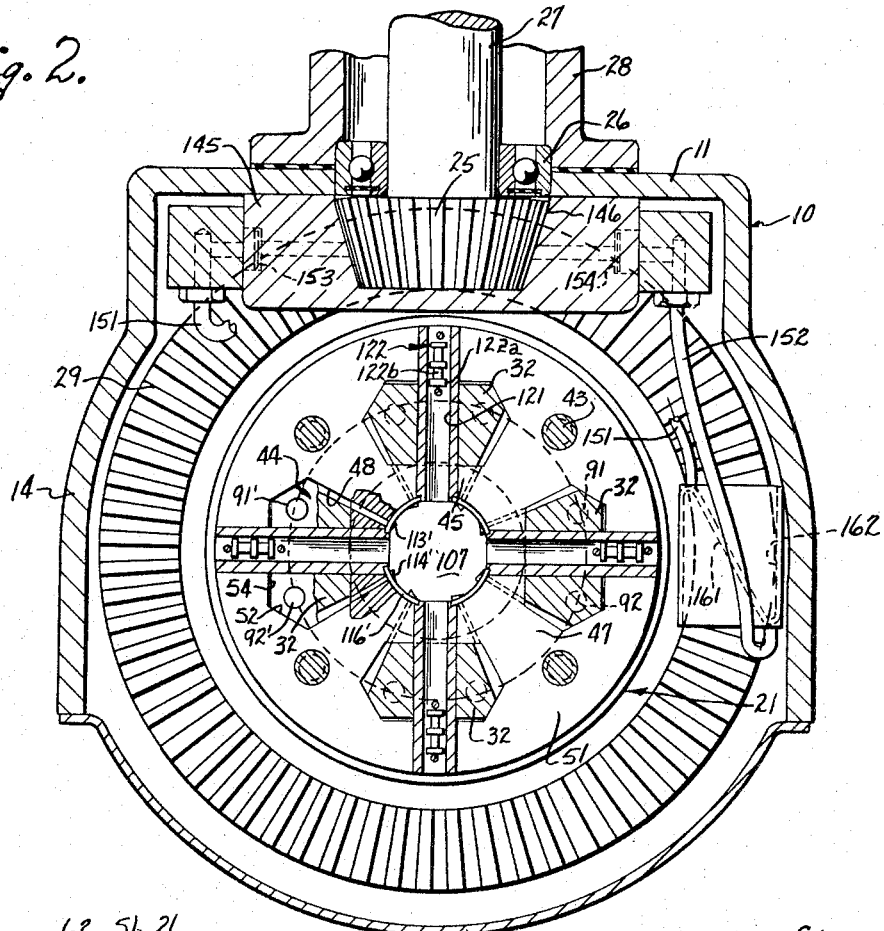
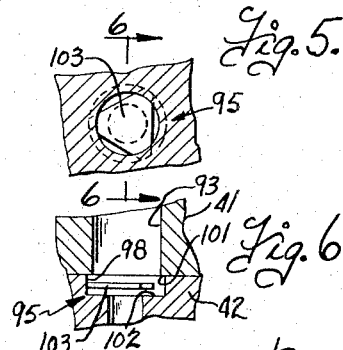
Inventor
Adiel Y. Dodge
By
McCanna, Morsbach & Pillote
Attorneys Nov. 7, 1967     A. Y. DODGE     3,350,961
LOCKING DIFFERENTIAL Filed Aug. 9, 1965     3 Sheets-Sheet 3

Inventor
Adiel Y. Dodge
By
McCanna, Morsbach & Pillote
Attorneys

United States Patent Office 3,350,961
Patented Nov. 7, 1967

3,350,961
LOCKING DIFFERENTIAL
Adiel Y. Dodge, Rockford, Ill.
(Lake Park, 1850 Alice St., Oakland, Calif. 94612)
Filed Aug. 9, 1965, Ser. No. 478,180
21 Claims. (Cl. 74—711)

ABSTRACT OF THE DISCLOSURE

A differential mechanism in which a pumping means inside the differential case is operative to displace fluid in proportion to the relative speed of the differentially driven output members. The case ring gear and drive pinion form a gear pump to feed fluid from the stationary differential housing to the pumping means inside the rotating case. The pumping means in the differential case is formed by the meshing sun and planet gears in the case and inlet and outlet check valves are arranged so that the intermeshing gears in the case circulate fluid from the reservoir through a flow restrictor and back to the reservoir in response to relative rotation of the differential sun gears in either direction.

This invention relates to differential mechanism and particularly to a differential mechanism having limited differential action.

An important object of this invention is to provide a differential mechanism which provides full differential action when the differentially driven wheels are turning at the same speed or at low relative speeds as occur during normal travel around curves and the like, and which provides rapid increase in the locking action when the differentially connected wheels begin to turn at relative speeds higher than those encountered in normal travel.

Another object of this invention is to provide a differential mechanism having hydraulic means for limiting differential action and which hydraulic means is arranged to retard differential action with a force that increases as an exponential function of the relative speeds of the differentially driven members.

Another object of this invention is to provide a differential mechanism having hydraulic means for limiting differential action and which also provides improved lubrication of the differential gears.

Still another object of this invention is to provide a differential mechanism having hydraulic means for limiting differential action and which also employs mechanical means that is hydraulically actuated to supplement the a hydraulic braking action.

A still further object of this invention is to provide a differential mechanism having hydraulic means for limiting differential action when the differential is driven in either a forward or reverse direction.

Still another object of this invention is to provide a differential mechanism including a differential housing and a differential case rotatable in the housing and arranged to produce a pumping action to provide high and low pressure areas at opposite sides of the mesh points during relative rotation of the sun and planet gears, and wherein the low pressure areas received fluid from the fluid reservoir and the high pressure areas are connected through separate discharge passages to return the fluid back to the reservoir without passing the same to the low pressure areas whereby restriction of the flow of fluid from the high pressure areas to the reservoir produces a hydraulic braking action.

An additional object of this invention is to provide a differential mechanism in which the differential case is arranged to produce a pumping action to provide high and low pressure areas at opposite sides of the mesh points of the differential sun and planet gears and the case has inlet and outlet passages for passing fluid to and from the high and low pressure points, and which case has an improved construction to simplify assembly of the gears and mounting of the inlet and outlet check valves in the case.

I find that the lubricating oil in the differential housing is a turbulent mixture of oil, air, foam, vapor and suds when the differential case is running. One of the main objects of this invention is to provide a means to deliver nearly solid oil to the pump cavities of the differential gears, more nearly free of foam, air or vapor than has been accomplished heretofore.

A still further object of this invention is to provide a differential mechanism including a differential housing forming a fluid reservoir and a differential case rotatably mounted in the housing and arranged to produce a pumping action with the differential sun and planet gears, and which differential mechanism has an improved pump arrangement in the differential housing for feeding fluid from the reservoir in the housing to the rotating differential case.

These, together with other objects and advantages of this invention will be more readily apparent as the invention becomes better understood by reference to the following detailed description when taken in connection with the accompanying drawings, wherein:

FIG. 2 is a longitudinal sectional view taken on the plane 2—2 of FIG. 1;

FIG. 4 is a sectional view through the differential case with the gears removed;

FIG. 5 is a fragmentary view taken on the plane 5—5 of FIG. 4 and illustrating one of the inlet check valves in the differential case;

FIG. 6 is a sectional view through the inlet check valve taken in the plane 6—6 of FIG. 5;

Figure 1:
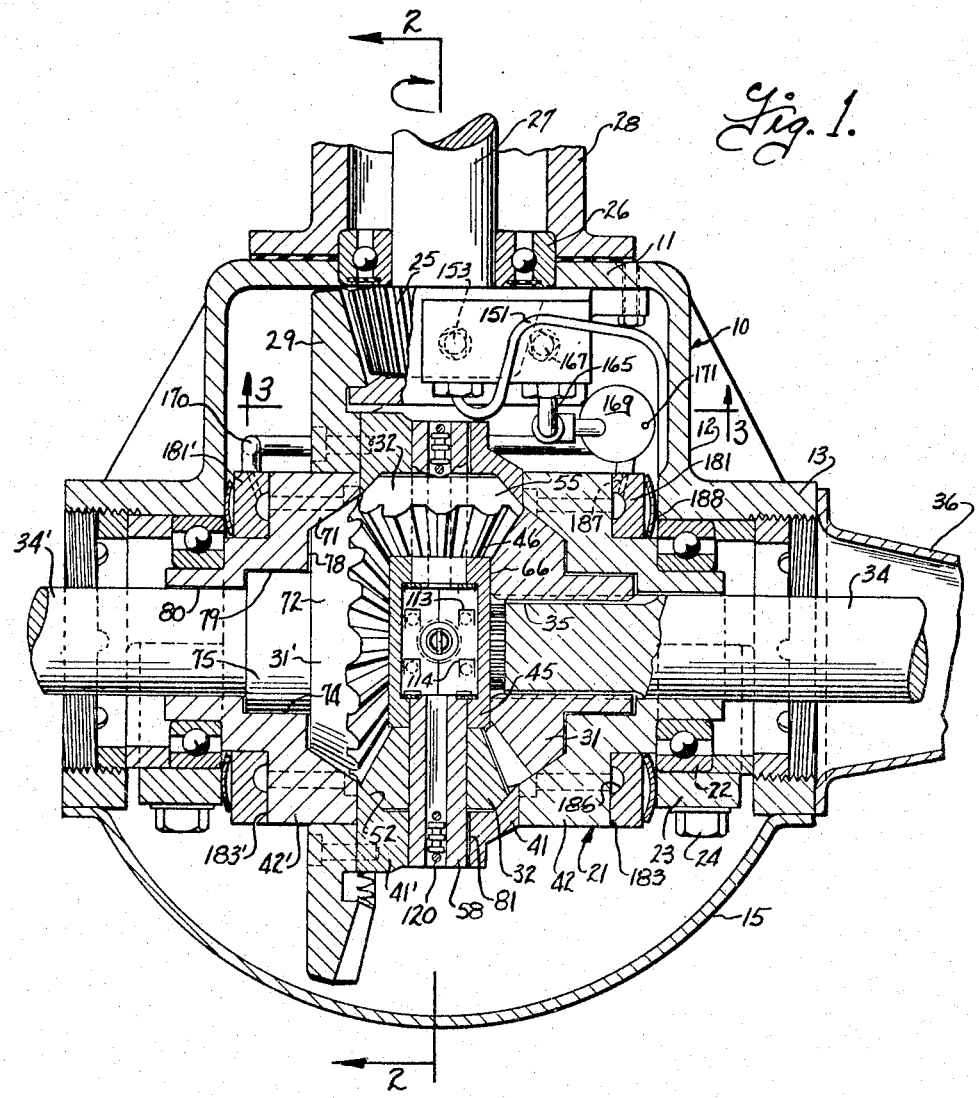
FIG. 1 is a horizontal sectional view through a differential mechanism embodying the invention.

The apparatus of the present invention is generally adapted for use in vehicles including trucks, automobiles, farm tractors, golf carts, and the like to provide a differential having limited differential action. The differential includes a differential housing 10 of any suitable construction to form a lubricant reservoir and, as shown, the housing comprises a casting having a forward wall 11, spaced side walls 12 having laterally extending hub portions 13, top and bottom walls 14 and a removable rear cover plate 15. A differential case, designated generally by the numeral 21 is rotatably mounted in the housing and, as shown, is supported by anti-friction bearings 22 in the hub portions 13. In the embodiment shown, the differential case is arranged to be inserted through the open rear side of the housing, when the cover 15 is removed, and the differential case is retained in position on the hub portion by generally U-shaped clamp members 23 which are secured to the housing as by fasteners 24. A drive pinion 25 is rotatably supported at the front of the differential housing 11, as by bearings 26 and is connected to a drive shaft 27 which extents through a drive shaft housing 28. The drive pinion 25 meshes with a ring gear 29 attached to or formed integrally with the differential case to rotate the latter about its axis.

A pair of differential sun gears 31 and 31', preferably of the bevel gear type, and herein sometimes referred to as differential side gears, are rotatably mounted in the differential case 21 for rotation relative thereto about the axis of rotation of the case. A plurality of differential planet gears 32, herein shown four in number are also rotatably mounted in the case and mesh with the sun gears 31 and 31'. As shown, the planet gears are also of the bevel gear type and are mounted for rotation about axes perpendicular to the axis of rotation of the sun gears. Axles 34 and 34' are drivingly connected to the differential sun gears 31 and 31', as by a spline connection indicated at 35, and the axles extend laterally through the hubs 13 of the differential housing and through axle housings 36 for connection to the drive wheels (not shown).

A hydraulic means is provided for limting differential action and, for this purpose, differential case 21 is constructed so as to extend into close adjacency to the sun and planet gears in the regions adjacent the mesh points thereof to produce a pumping action when the sun and planet gears rotate relative to each other. The differential case is advantageously formed in a plurality of separable sections including a pair of intermediate sections 41 and 41' and a pair of end sections 42 and 42' which are held together by fasteners 43 such as bolts which extend through the several sections and clamp the same together. The intermediate sections 41 and 41' are similarly formed and like numerals are used to designate the corresponding parts. These intermediate sections are arranged to extend closely around the planet gears 32 and have a plurality of angularly spaced cavities 44 corresponding to the number of planet gears formed in the abutting faces thereof and shaped to extend closely adjacent the peripheries of the respective planet gears 32. As best shown in FIG. 4, the intermediate sections include an inner case portion 45 disposed inside the planet gears and which has angularly spaced faces 46 that overlie the inner ends of the planet gears and segmental portions 47 that extend outwardly from the inner case portion 45 between adjacent planet gears and which define the frusto-conical walls 48 that surround the peripheries of the teeth on the planet gears. The intermediate sections also include an outer case portion 51 which extends around the outside of the planet gears and which defines wall portions complementary to the outer faces of the planet gears. For reasons pointed out hereinafter, the gear cavities 44 preferably have generally conical outer wall portions 52 shaped complementary to generally conical end faces 53 on the planet gears, and a base wall 54 which is preferably spaced slightly from the outer end face of the planet gears. The planet gears are mounted for rotation on pins 58 and the latter are advantageously supported at the inner and outer ends in semi-cylindrical recesses 61 and 62 formed in the inner and outer case portions 45 and 51 respectively in the intermediate case. The intermediate sections 41 and 41' also have sun gear cavities 65 and 65', shaped to conform to the inner faces of the sun gears 31 and 31'. As also best shown in FIG. 4, the inner portions 45 of the intermediate sections have side faces 66 arranged to engage the inner ends of the sun gears of frusto-conical wall portions 67 shaped to extend closely adjacent the peripheries of the teeth on the sun gears, and which sun gear cavities intersect the semi-conical planet gear cavities 44. The end sections 42 and 42' of the differential case are shaped to conform to the rear sides of the sun gears and to rotatably support the same. For reasons pointed out hereinafter, the outer portions 42 and 42' are each formed with cavities having a frusto-conical wall portion 71 shaped to conform to the frusto-conical rear face on the sun gears. The end sections of the case also have bores 74 which rotatably receive hub portions 75 on the sun gears and openings 76 which receive the differential shafts 34 and 34'. As best shown in FIG. 1, the cavities 71 for receiving the conical outer faces of the gears are dimensioned so that the inner walls 78 thereof are spaced somewhat from the outer face of the gears and this space is vented to a low pressure area externally of the case as through vent passages 79 and 80.

Similarly, the pinion cavities at the rear faces of the pinion gears are vented to a low pressure area externally of the case as through a vent passage 81.

The sun and planet gears, at each mesh point thereof, thus form a gear-type pump having pressure zones at opposite sides of the mesh points of the gears. The pressures in the two zones of each gear pump will vary dependent upon the direction and speed of relative rotation of the gears. When there is no relative rotation between the gears, there is no pumping action and the pressure in the zones at opposite sides of the mesh points of the gears is substantially equalized. However, when the gears do rotate relative to each other, low pressure is produced at the side of the mesh point where the gears are separating and a high pressure occurs at the side of the mesh point where the gears are coming together. Since each planet gear meshes with two sun gears, each planet gear effectively forms two pumps. Accordingly, when four planet gears are employed as illustrated in the present embodiment, the differential case effectively forms eight gear pumps with the sun and planet gears. Since each of the gear pumps is similar in construction and operation, like numerals are used to designate corresponding parts.

In prior differential mechanisms which were arranged to utilize the differential sun and planet gears as gear pumps to hydraulically limit differential action, it has been the common practice to interconnect the high and low pressure areas at relatively opposite sides of the mesh points of the gears through a restricted flow passage so that fluid from the high pressure area is by-passed through the restricted flow passage to the low pressure area. In accordance with the present invention, fluid is supplied to the low pressure areas of the gear pumps from the fluid reservoir in the differential housing and fluid is discharged from the high pressure areas through a flow restriction back to the fluid reservoir in the differential housing instead of to the low pressure areas in the gear pumps. As diagramatically shown in FIG. 8, each planetary gear 32 forms a pair of pumping cavities or pressure zones designated 91 and 92 at opposite sides of its mesh point with sun gear 31 and forms a similar pair of pump cavities or pressure zones 91' and 92' at opposite sides of its mesh point with the other sun gear 31'. When the sun and planet gears rotate relative to each other, for example in the directions indicated by the arrows in FIG. 8, the zone such as 91 at one side of the mesh point of the planet gear 32 with the sun gear 31 will be a low pressure zone and the zone 92 at the opposite side will be a high pressure zone. However, the zone 91' at one side of the mesh point of the planet gear 32 with the sun gear 31' will be a high pressure zone under these conditions and the zone 92' will be the low pressure zone. In the preferred embodiment illustrated, one set of inlet passages designated 93 and 94 are provided in the case for supplying fluid to the pump ports or pressure zones 91 and 92 and a separate set designated 93' and 94' are provided for supplying fluid to the other pressure zones 91' and 92'. Inlet check valves 95, 95' and 96, 96' are provided in the conduits 93, 93' and 94, 94' respectively and are arranged to open for flow to the respective pressure zones and to close to prevent return flow. The pairs of check valves 95 and 96 for controlling the flows of fluid through the pairs of pumping cavities formed between each planet gear 32 and the side gear 31 are conveniently located at the interface between the intermediate section 41 and the end section 42 and, similarly, the pairs of inlet check valves 95' and 96' for controlling the flows of fluid to the pairs of pumping cavities between each planetary gear and the other sun gear 31' are conveniently located at the interface between the other intermediate section 41' and the adjacent end section 42' of the differential case. While the inlet check valves can be of any suitable construction, they are conveniently formed in the manner best shown in FIGS. 5 and 6. As illustrated, the inlet check valves include a valve chamber 98 conveniently in the form of a counterbore formed in the respective end section 42, 42′, intermediate the ends of the respective inlet passages in the case. The counterbore defines a valve seat 102 and a shoulder 101 spaced from the seat. A valve disk 103 is disposed in the counterbore and is arranged to engage the seat to block flow from the pumping cavities and to open for flow to the pumping cavities. As will be seen from FIGS. 5 and 6, the shoulder 101 is arranged to limit movement of the valve disk 103 away from the seat 102 and the valve plate 103 is cut away at its periphery so as to allow flow when the disk engages the shoulder.

Figure 8:
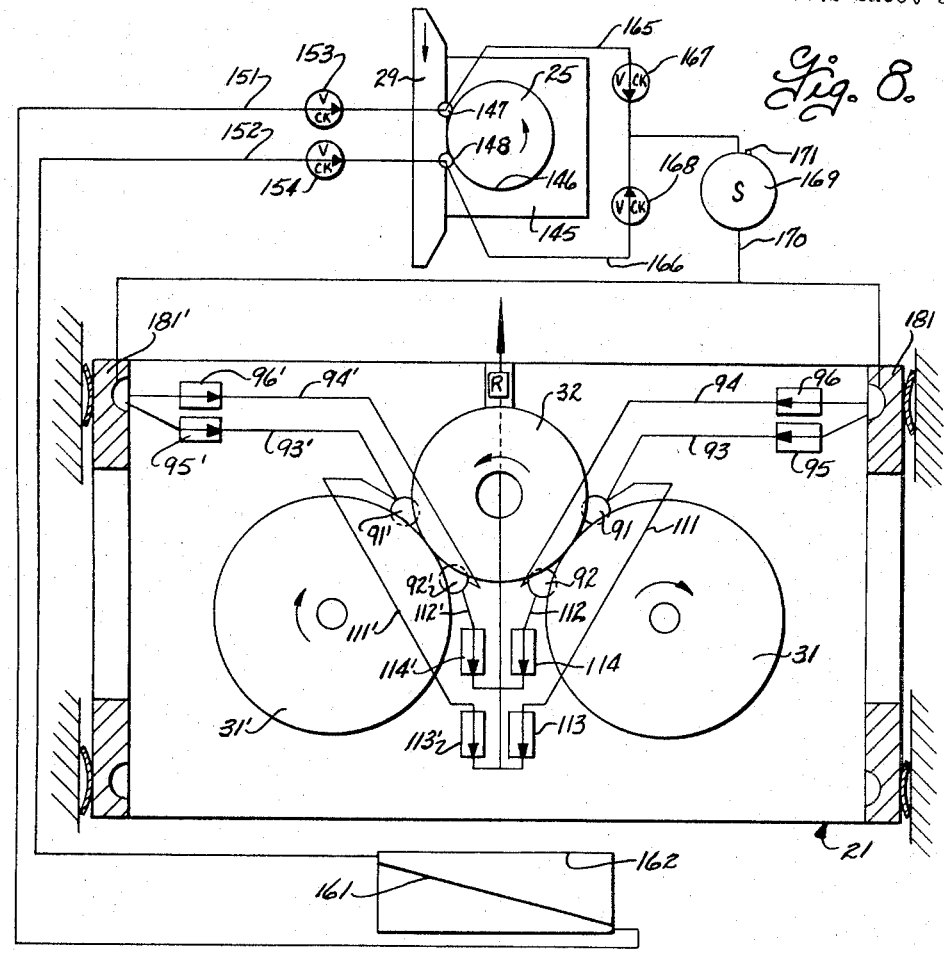
FIG. 8 is a schematic view illustrating the hydraulic flows through the differential apparatus.
Figure 7:
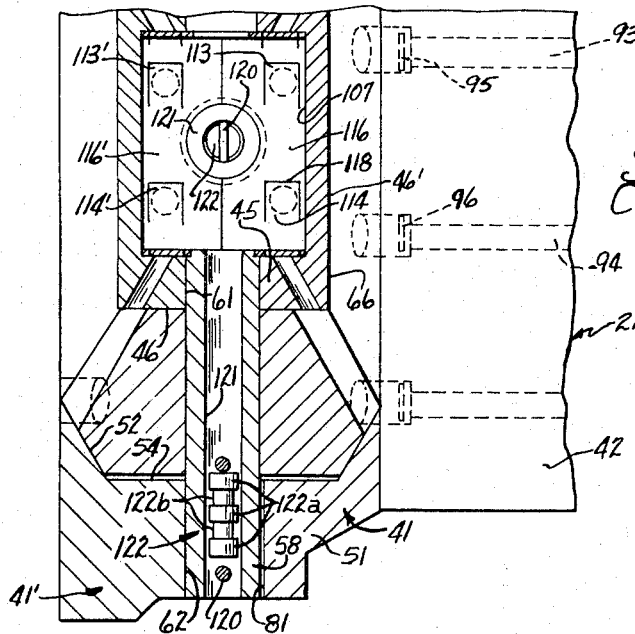
FIG. 7 is a fragmentary sectional view through the differential case on a larger scale than FIG. 1.

The inner portion 45 of the intermediate sections 41, 41′ have registering recesses defining a preferably cylindrical cavity 107 formed therein and which forms a discharge chamber internally of the sun and planet gears. As best shown in FIGS. 4 and 8 pairs of outlet passages 111, 112 are provided for communicating the pressure zones 91 and 92 associated with the planet gear 32 and sun gear 31 with the outlet chamber 107 and, similarly, pairs of outlet passages 111′ and 112′ are provided for connecting the pressure zones 91′ and 92′ associated with each planet gear 32 and the other sun gear 31′ with the outlet chamber. Outlet check valve means 113, 114, and 113′, 114′ are provided for controlling flow through the outlet passages and are arranged to open for flow to the outlet chamber, and to close to prevent return flow. While the outlet check valves can be suitable construction, they are preferably formed in the manner best shown in FIGS. 2 and 7. In particular, the pair of sleeves 116, 116′ are snugly positioned in the generally cylindrical cavities 107 of the outlet chamber and the sleeves are cut along generally U-shaped lines indicated at 118 in FIG. 7 to form reed-type valves which overlie the inner ends of the outlet ports. As will be seen, the reed valves are arranged to open for flow to the outlet chamber and to close to prevent return flow. The sleeves are conveniently retained against turning in the outlet chamber by engagement with reduced ends on the planetary support shafts 58 as is clearly shown in FIG. 7.

Fluid from the outlet chamber 107 is returned to the reservoir through the passages which extend from the outlet chamber to a point externally of the case. This is conveniently achieved by forming passages designated 121 in at least one and preferably several of the planet gear support shafts 58. The passages communicate at their inner ends with the discharge chamber 107 and extend radially outwardly to the outer periphery of the case and a flow restricting means 122 is provided in each of the flow passages 121. It is very desirable in a differential mechanism to provide free differential movement at low differential speeds, such as occur during turning corners, going around curves and the like, and to provide a retarding force that increases rapidly as the differential speed rises above the aforedescribed relatively low differential speed necessary for turning. The flow restrictors 122 are accordingly advantageously arranged to define a labyrinth flow restriction having a plurality of serially related alternate high flow velocity and low flow velocity zones to cause the back pressure in the discharge chamber 107 and hence at the tooth spaces in the high pressure zones of the gear pumps to build up as an exponential function of the velocity of the fluid flow from the gear pumps formed in the differential case. As shown, the flow restrictors comprise generally spool-shaped members having a plurality of lands 122a which extend closely adjacent the walls of the passages 121 to form a flow restriction therewith to produce a series of high flow velocity zones and which lands are separated by grooves 122b sufficiently smaller than the lands to provide a low flow velocity zone for the fluid after it passes each land. The labyrinth flow restrictor will cause the fluid pressure to build up at a rate somewhat faster than the square of the velocity of the fluid flowing through the flow restriction and may, for example, be so arranged as to cause the pressure to build up as the third or even the fourth power of the flow velocity. With this arrangement, the flow restrictor will produce a relatively low back pressure at the low flow velocities that occur at low differential speeds and the back pressure will build up rapidly to a high value as the differential speed increases, to thereby limit differential action. If the fluid employed in the differential housing is of a type than which the viscosity decreases substantially with increasing temperature, the flow restrictors can advantageously be formed of a material having coefficient of thermal expansion which is high as compared to that of the material that forms the passages 121, and so selected as to decrease the flow area between the lands and the walls of the passage as the temperature increases, to thereby compensate for changes in viscosity. The spool restrictors 122 are retained in the passages 121 by pins 120 and can be removed and replaced with spools of different size to provide different braking action.

Figure 3:
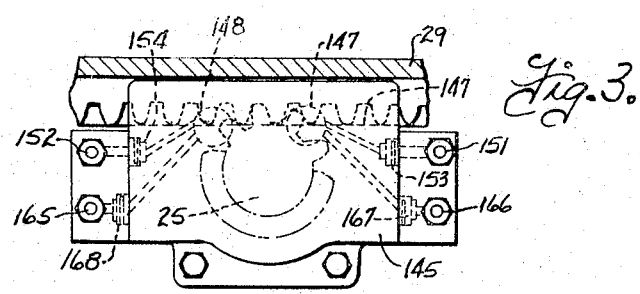
FIG. 3 is a fragmentary sectional view taken on the plane 3—3 of FIG. 1 and illustrating the fluid supply pump.

An improved feed arrangement is provided for feeding fluid from the reservoir in the differential housing to the inlet passages in the differential case. When the differential is in operation, the lubricant in the differential housing does not remain at a fixed level but is instead highly agitated and forms a turbulent mixture of oil, air and foam. However, a substantial portion of the oil is picked up and thrown outwardly by the rotating ring gear 29 and forms somewhat of a torus inside the differential housing adjacent the ring gear. In accordance with the present invention, a feed pump is provided on the differential housing and associated with the ring gear 29. This is advantageously achieved by a pump casing 145 mounted on the differential housing 11 to extend into close running fit with the ring and pinion gears 29 and 25 adjacent their mesh points to form a gear pump therewith. As shown in FIG. 2, the casing 145 has a generally frustoconical cavity 146 for receiving the drive pinion 25 and has a side face 147 (FIG. 3) that intersects the cavity 146 and is shaped to form a running seal with the teeth on the ring gear 29. As best shown in FIG. 3, the ring and pinion gears define pump chambers 147, 148 at opposite sides of their mesh point, one of which chambers forms an inlet chamber the other which forms an outlet chamber, depending upon the direction of rotation of the drive pinion. A substantial quantity of fluid will be carried by the teeth on the ring gear to the mesh point between the ring gear and the drive pinion to the feed pump thereby. It is preferably, however, to provide inlet feed passages for feeding fluid to the low pressure chamber in the feed pump to assure filling of the two spaces. In order to adapt the device for reversible operation, that is for operation in either direction of rotation of the drive pinion, dual supply lines 151 and 151 are provided and respectively communicate with the pump chambers 147 and 148. Check valves 153 and 154, of any suitable construction are provided in the supply lines and arranged to open for flow to the pump and to close to block return flow. These check valves are conveniently mounted in the pump casing 145, as best shown in FIG. 3, and may conviently be of the type employed as inlet check valves and better illustrated in FIGS. 5 and 6.

As previously described, the oil in the differential housing is thrown out by the ring gear and forms a torus inside the differential housing. The inlet ends of the supply lines 151 and 152 are advantageously arranged to collect this fluid and, as shown, the supply lines are connected to oppositely facing scoops designated 161 and 162. The scoops are positioned as best shown in FIG. 2 adjacent the bottom of the differential housing and with the scoops 161 and 162 facing in relatively opposite directions to receive fluid when the differential is operated in a reverse and forward direction respectively.

Fluid from the supply pump chambers 147 and 148 is delivered to feed passages 165 and 166 and outlet check valves 167, 168 and delivery lines 170 to the inlet passages in the differential case. The outlet check valves 167, 168 can conveniently be mounted on the pump case 145, as shown in FIG. 3 and an air separater 169, of any conventional construction, is preferably provided in the delivery line to eliminate at least a substantial portion of any air passed by the feed pump. The air eliminator may, for example, comprise a chamber having a restricted air vent port indicated at 171 in FIG. 8, which port is arranged to provide a relatively low impedance to the flow of gaseous fluids such as air, and to provide a substantially higher impedance to the flow of liquid lubricant, to thereby vent air from the delivery line while maintaining sufficient pressure on the liquid to feed the same to the differential case.

Fluid distributor rings 181 and 181' are provided for conveying fluid from the stationary feed pump to the rotating differential case. As best shown in FIGS. 1, 2 and 4, the several inlet passages 93, 94 extend through and open on an end face 183 at one end of the differential case and, similarly, the several inlet passages 193', 194' extend through and open on a second end face 183' at the other end of the differential case. The distributor rings are constrained against rotation relative to the housing by any suitable means such as the delivery conduits 165 and engage the respective end faces 183, 183' of the differential case to form a running seal therewith. At least one of the items comprising the distributor ring and the end face of the differential case have a distributor groove 186 therein which communicates with the ends of the inlet passages to supply fluid thereto, and the distributor grooves are connected through lateral passages 187 to the delivery conduits 170. The distributor rings 181 are preferably yieldably urged into engagement with the end faces of the case as by spring washers 188 to maintain a close running fit therewith. Preferably, the springs 188 are selected so as to allow the distributor rings to shift away from the end faces of the differential case when the pressure exceeds a preselected value, so that the distributor rings also function as relief valves for the supply pump.

From the foregoing it is thought that the construction and operation of the differential will be readily understood. The feed pump formed by the ring gear 29 and pinion gear 25 is arranged to withdraw fluid from the sump or scoop 162 through supply line 152 and check valve 154 when the drive pinion rotates in a forward direction and to withdraw fluid from the sump 161 through line 151 and check valve 153 when the drive pinion rotates in a reverse direction. The check valves 153 and 154 are arranged to close when the drive pinion is respectively rotated in a forward and reverse direction to block return flow through the supply lines and fluid is delivered from the feed pump through lines 165 or 166 depending on the direction of rotation to the distributor rings 181, 181'. When the differential output shafts 34 and 34' are rotating in unison, the sun and planet gears do not rotate relative to each other and there is no pumping action inside the differential case. When the differential output shafts 34 and 34' turn relative to each other, the differential planet and sun gears pump fluid from one or the other of the inlet passages 93 or 94 and 93' and 94', depending on the direction of relative rotation theerbetween and deliver fluid under pressure to one or the other of the outlet passages 111, 112 and 111', 112'. The inlet check valves in those inlet passages that communicate with high pressure zones close to prevent return flow through the inlet passages and the outlet check valves in those passages which communicate with low pressure zones close to prevent return flow from the discharge chamber 107. Fluid from the chamber 107 is discharged through the passages 121 past the outlet flow restrictors 122. As previously described, the outlet flow restrictors provide a labyrinth flow passage and produce a low back pressure when the sun and planet gears are rotating relative to each other at low speeds as occur during turning corners and the like to thereby provide free differential action under normal driving conditions. However, the labyrinth flow restrictor causes the back pressure to build up rapidly when the velocity of flow increases, as occurs when one wheel begins to spin, and thus impose a high impedence to relative rotation of the sun and planet gears. In addition, the sun and planet gears have conical back faces which cooperate with conical cavities in the differential case to form cone-type clutches and these clutches are activated in response to the mechanical and hydraulic pressures on the tooth sides of the gears to thereby provide a mechanical resistance to relative rotation. Since the hydraulic pressure on the inter-tooth spaces increases rapidly as a function of the relative speed of rotation of the sun and planet gears, it will be seen that the mechanical braking action also increases rapidly under these conditions. The rear sides of the differential and side gears are vented through the aforedescribed passages 79, 80 and 81 back to the differential housing so as to allow the cone-type clutches on the differential sun and planet gears to engage in response to pressure at the toothed sides of the gears. Since the fluid from the high pressure zones in the differential case is vented through flow restrictors back to the reservoir instead of to the low pressure zones of the differential case, there is no loss in the hydraulic braking action due to feed back to the low pressure zones. In addition, this provides a flow through of the lubricant from the reservoir through the differential case and back to the reservoir which produces improved lubrication and allows cooling of the lubricant by return to the differential housing. Since the feed pump is associated with the ring gear and has the sumps or inlets positioned to receive the lubricant thrown out by the ring gear, an adequate supply of lubricant to the differential case is assured.

I claim:

1. A differential mechanism comprising, a differential housing defining a fluid reservoir, a differential case rotatably mounted in the housing, a pair of differential sun gears rotatably mounted in the case and differential planet gears rotatably mounted in the case and in mesh with the sun gears, said case including means extending into close running fit with the sun and planet gears in the region adjacent the mesh points thereof to produce a pumping action, inlet passage means communicating with the intertooth spaces at each side of the mesh points of the sun and planet gears for passing fluid from the reservoir to the intertooth spaces, inlet check valve means controlling flow through the inlet passage means operative to open for flow to the tooth spaces and to close to block return flow, outlet passage means communicating with the intertooth spaces at each side of the mesh points of the sun and planet gears and extending to a point externally of said differential case for passing fluid back to the reservoir, outlet check valve means in said outlet passage means operative to open for flow from the intertooth spaces and to close to prevent return flow, and flow restrictor means for throttling flow through said outlet passage means back to the reservoir to retard relative rotation of the planet and sun gears.

2. A differential mechanism comprising, a differential housing defining a fluid reservoir, a differential case rotatably mounted in the housing, a pair of differential sun gears rotatably mounted in the case and differential planet gears rotatably mounted in the case and in mesh with the sun gears, said case including means extending into close running fit with the sun and planet gears in the region adjacent the mesh points thereof to produce a pumping action, inlet passage means defining four inlet passageways for each planet gear communicating with the intertooth spaces at opposite sides of the mesh points of each planet gear with the sun gears, inlet check valves in each of said inlet passageways operative to open for flow to the tooth spaces and to close to prevent return flow, outlet passage means extending to a point externally of the differential case for passing fluid back to the reservoir and including four outlet passageways for each planet gear communicating with the intertooth spaces at opposite sides of the mesh points of each planet gear with the sun gears, outlet check valves in each of said outlet passageways operative to open for flow from the tooth spaces and to close to prevent return flow, and flow restrictor means for throttling flow through said outlet passage means to retard relative rotation between said planet and sun gears.

3. A differential mechanism comprising, a differential housing defining a fluid reservoir, a differential case rotatably mounted in the housing, a pair of differential sun gears rotatably mounted in the case and differential planet gears rotatably mounted in the case and in mesh with the sun gears, said case including means extending into close running fit with the sun and planet gears in the region adjacent the mesh points thereof to produce a pumping action, inlet passage means communicating with the intertooth spaces at each side of the mesh points of the planet gears with the sun gears, means for feeding fluid from said reservoir in the housing to said inlet passage means, inlet check valve means in said inlet passage means operative to open for flow from said feed means to the intertooth spaces and to close to prevent return flow, outlet passage means communicating with the intertooth spaces at each side of the mesh points of the planet gears with the sun gears and having an outlet external of said case for returning fluid to the reservoir, outlet check valve means operative to open for flow from said tooth spaces and to close to prevent return flow, and flow restrictor means for throttling flow through said outlet passage means back to the reservoir to retard relative rotation of the planet and sun gears.

4. A differential mechanism comprising, a differential housing defining a fluid reservoir, a differential case rotatably mounted in the housing, a pair of differential sun gears rotatably mounted in the case and differential planet gears rotatably mounted in the case and in mesh with the sun gears, said case including means extending into close running fit with the sun and planet gears in the region adjacent the mesh points thereof to produce a pumping action, inlet passage means communicating with the intertooth spaces at each side of the mesh points of the planet gears with the sun gears, means for feeding fluid from said reservoir in the housing to said inlet passage means, inlet check valve means controlling flow through said inlet passage means operative to open for flow from the feed means to the intertooth spaces and to close to prevent return flow, said case including means defining a chamber inside of said sun and planet gears and a plurality of outlet passageways communicating said chamber with the intertooth spaces at each side of the mesh point of the planet gears with the sun gears, check valves in said outlet passageways operative to open for flow from the intertooth spaces to the chamber and to close to prevent return flow, discharge passage means for passing fluid from said chamber to a point externally of said case for return to the reservoir, and flow control means in said discharge passage means for limiting flow from the chamber back to the reservoir to retard relative rotation of the planet and sun gears.

5. In a differential mechanism including a differential housing defining a fluid reservoir, a differential case mounted in said housing for rotation about an axis, a ring gear on the case and a drive pinion on the housing in mesh with the ring gear to rotate the case, differential sun gears rotatably mounted in the case and differential planet gears rotatably mounted in the case in mesh with the sun gears, said differential mechanism including pumping means in said case and operative to produce a pumping action in response to relative rotation of said sun gears, the improvement comprising means extending into close running fit with said ring gear and drive pinion defining a gear pump therewith for pumping fluid from said reservoir, and passage means for conveying fluid discharged from said gear pump to said pumping means in said case.

6. In a differential mechanism including a differential housing defining a fluid reservoir, a differential case mounted in the housing for rotation about an axis, a ring gear on the case and a drive pinion on the housing meshing with the ring gear to rotate the case, differential sun gears rotatably mounted in the case and differential planet gears rotatably mounted in the case and in mesh with the sun gears, said case including means extending into close running fit with the sun and planet gears thereof to produce a pumping action, the improvement comprising means extending into close running fit with said ring gear and drive pinion defining a gear pump therewith for pumping fluid from said reservoir, and passage means for conveying fluid discharged for said gear pump to the intertooth spaces in the sun and planet gears adjacent the mesh points thereof.

7. In a differential mechanism including a differential housing defining a fluid reservoir, a differential case mounted in the housing for rotation about an axis, a ring gear on the case and a drive pinion on the housing meshing with the ring gear to rotate the case, differential sun gears rotatably mounted in the case and differential planet gears rotatably mounted in the case and in mesh with the sun gears, said case including means extending into close running fit with the sun and planet gears in the region adjacent the mesh points thereof to produce a pumping action, the improvement comprising means extending into close running fit with the drive pinion and ring gear at opposite sides of the mesh point thereof to produce a gear pump therewith, first and second inlet passages communicating with the intertooth spaces in the ring gear and drive pinion at opposite sides of the mesh point thereof to pass fluid to the gear pump in either direction of rotation of the ring gear, inlet check valve means controlling flow through said inlet passages operative to open for flow to the tooth spaces and to close to prevent return flow, and outlet passage means for passing fluid from the gear pump to the intertooth spaces in the sun and planet gears adjacent the mesh points thereof.

8. The combination of claim 7 wherein said first and second inlet passages have first and second fluid collector scoops at their inlet ends disposed adjacent said ring gear and respectively opening in directions opposite the forward and reverse direction of rotation of the ring gear.

9. In a differential mechanism including a differential housing defining a fluid reservoir, a differential case mounted in the housing for rotation about an axis, a ring gear on the case and a drive pinion on the housing meshing with the ring gear to rotate the case, differential sun gears rotatably mounted in the case and differential planet gears rotatably mounted in the case and in mesh with the sun gears, said case including means extending into close running fit with the sun and planet gears in the region adjacent the mesh points thereof to produce a pumping action, the improvement comprising means extending into close running fit with the drive pinion and ring gear at opposite sides of the mesh point thereof to produce a gear pump therewith having first and second pump zones at said opposite sides of the mesh point, first and second inlet passages respectively communicating with said first and second pump zones, said first and second inlet passages having first and second fluid collector scoops at their inlet ends located adjacent the lower part of the differential housing adjacent the ring gear and respectively opening in directions opposite the forward and reverse directions of rotation of the ring gear, first and second inlet check valve means in said first and second inlet passages operable to open for flow from the respective scoop and to close to prevent return flow, outlet passage means communicating with said first and second pump zones for passing fluid therefrom to the intertooth spaces in the sun and planet gears adjacent the mesh points of the latter, and outlet check valve means in said outlet flow passages operative to open for flow from the pump zones and to close to prevent return flow.

10. In a differential mechanism including a differential housing defining a fluid reservoir, a differential case mounted in the housing for rotation about an axis, a ring gear on the case and a drive pinion on the housing meshing with the ring gear to rotate the case, differential sun gears rotatably mounted in the case and in mesh with the sun gears, said case including means extending into close running fit with the sun and planet gears thereof to produce a pumping action, the improvement comprising means extending into close running fit with the drive pinion and ring gear at opposite sides of the mesh point thereof to produce a gear pump therewith having first and second pump zones at said opposite sides of the mesh point, first and second inlet passages respectively communicating with said first and second pump zones, said first and second inlet passages having first and second fluid collector scoops at their inlet ends located adjacent the lower part of the differential housing adjacent the ring gear and respectively opening in directions opposite the forward and reverse directions of rotation of the ring gear, first and second inlet check valve means in said first and second inlet passages operable to open for flow from the respective scoop and to close to prevent return flow, means defining a stationary fluid distributing ring on the housing having a running fit with the differential case, the case having a plurality of passageways communicating with the intertooth spaces at opposite sides of the mesh points of the sun and planet gears and extending to the interface between the distributing ring and the case, and feed passage means communicating with said first and second pump zones for passing fluid therefrom to the distributing ring for flow to the passageways in the case.

11. The combination of claim 10 wherein said distributing ring engages a generally radial wall portion at the end of the case and means is provided to yieldably urge the distributing ring into engagement with said radial wall portion on the case.

12. In a differential mechanism including a differential housing defining a fluid reservoir, a differential case mounted in the housing for rotation about an axis, a ring gear on the case and a drive pinion on the housing meshing with the ring gear to rotate the case, differential sun gears rotatably mounted in the case and differential planet gears rotatably mounted in the case and in mesh with the sun gears, said case including means extending into close running fit with the sun and planet gears in the region adjacent the mesh points thereof to produce a pumping action, said case having a plurality of passageways therein communicating at one end with the intertooth spaces in the sun and planet gears adjacent the mesh points thereof, said case having an annular seal face thereon and said passageways having the other ends thereof opening at said seal face, a stationary fluid distributing ring on said housing engaging said seal face on the case, means extending onto close running fit with said ring gear and drive pinion adjacent the mesh point thereof defining a gear pump for pumping fluid from said reservoir, said gear pump having an outlet, and passage means for passing fluid from said gear pump outlet to said distributor ring for flow to said passageways in the case.

13. In a differential mechanism including a differential housing defining a fluid reservoir, a differential case mounted in the housing for rotation about a case axis, a ring gear on the case and a drive pinion on the housing meshing with the ring gear to rotate the case, first and second differential sun gears mounted in the case for rotation relative thereto about said case axis and differential planet gears rotatably mounted in the case and in mesh with the sun gears, and case including means extending into close running fit with the sun and planet gears in the region adjacent the mesh points thereof to produce a pumping action, said case having first and second seal faces at opposite ends, said case having a first passage means extending from said first seal face and communicating with the intertooth spaces adjacent the mesh points of the first sun gear with the planet gears and a second passage means extending from the second seal face and communicating with the intertooth spaces adjacent the mesh points of the second sun gear with the planet gears, first and second fluid distributing rings mounted on said housing, means yieldably urging said first and second distributing rings into running engagement with said first and second seal faces and operative to allow the rings to shift away from the respective seal faces to prevent build-up of excessive fluid pressure thereat, and pump means in the differential housing for pumping fluid from said reservoir to said first and second distributing rings.

14. In a differential mechanism including a differential housing defining a fluid reservoir, a differential case mounted in the housing for rotation about an axis, a ring gear on the case and a drive pinion on the housing meshing with the ring gear to rotate the case, differential sun gears rotatably mounted in the case and differential planet gears rotatably mounted in the case and in mesh with the sun gears, said case including means extending into close running fit with the sun and planet gears in the region adjacent the mesh points thereof to produce a pumping action, and outlet passage means communicating with the intertooth spaces at one side of the mesh points of the sun and planet gears, the improvement comprising flow restrictor means in the outlet passage means defining a labyrinth flow passage having a plurality of serially related alternate high flow velocity and low flow velocity zones to cause the back pressure at said one side of the mesh points of the gears to build-up as an exponential function of the rate of discharge of fluid from the gear pumps formed by the sun and planet gears.

15. In a differential mechanism comprising, a differential housing defining a fluid reservoir, a differential case rotatably mounted in the housing, a pair of differential sun gears rotatably mounted in the case and differential planet gears rotatably mounted in the case and in mesh with the sun gears, said case including means extending into close running fit with the sun and planet gears in the region adjacent the mesh points thereby to produce a pumping action, inlet passage means communicating with the intertooth spaces at each side of the mesh points of the sun and planet gears for passing fluid from the reservoir to the intertooth spaces, inlet check valve means controlling flow through the inlet passage means operative to open for flow to the tooth spaces and to close to block return flow, outlet passage means communicating with the intertooth spaces at each side of the mesh points of the sun and planet gears and extending to a point externally of said differential case for passing fluid back to the reservoir, outlet check valve means in said outlet passage means operative to open for flow from the intertooth spaces and to close to prevent return flow, and flow restrictor means in said outlet passage means defining a labyrinth flow passage having serially related alternate high flow velocity and low flow velocity zones to cause the back pressure at one side of the mesh points of the gears to build-up as an exponential function of the rate of discharge of fluid from the gear pumps formed by the sun and planet gears.

16. The combination of claim 15 wherein said flow restrictor means includes a spool shaped member having a plurality of axially spaced lands defining grooves therebetween, the lands having a sufficiently close fit in said flow passage means to define a series of high flow velocity zones and said grooves defining low flow velocity zones between the high flow velocity zones.

17. In a differential mechanism including a differential housing defining a fluid reservoir, a differential case mounted in the housing for rotation about an axis, a ring gear on the case and a drive pinion on the housing meshing with the ring gear to rotate the case, a pair of bevel type side gears mounted on the case for rotation about said case axis, bevel type planet gears mounted on the case for rotation about axes transverse to said case axis and meshing with said side gears, said case including means extending into close running fit with said side and planet gears in the region adjacent the mesh points thereof to produce a pumping action, outlet passage means communicating with the intertooth spaces adjacent the mesh points thereof and flow restriction means in said outlet passages defining a labyrinth flow passage having serially related alternate high flow velocity and low flow velocity zones for restricting flow therefrom to produce a back pressure at the intertooth spaces adjacent the mesh points of the gears which builds up as an exponential function of the rate of discharge of fluid from the gear pumps formed by the side and planet gears, at least one of the items comprising said side and planet gears having conical wall portions at the outer side thereof, said case having conical recesses for receiving said conical back faces to form a cone-type clutch therewith, and means for communicating said recesses with a low pressure area in the housing whereby the mechanical and hydraulic thrust on the gear teeth side of said one of said items urges the same into frictional engagement with said conical recesses.

18. In a differential mechanism including a differential housing defining a fluid reservoir, a differential case mounted in the housing for rotation about an axis, a ring gear on the case and a drive pinion on the housing meshing with the ring gear to rotate the case, differential pinion gears meshing with the side gears and mounted on the case for rotation about axes transverse to said case axis, said case including an inner case portion disposed internally of the side and differential pinion gears and an external case portion disposed externally of the differential side and pinion gears, said inner and outer case portions extending into close running fit with the side and differential pinion gears in the regions adjacent the mesh points thereof to produce a pumping action, said inner case portion having an annular chamber therein and a plurality of passageways communicating said chamber with the intertooth spaces adjacent the mesh points of the side and differential pinion gears, and a sleeve member in said chamber having a plurality of reed-type check valves therein controlling flow through said passageways.

19. In a differential mechanism including a differential housing defining a fluid reservoir, a differential case mounted in the housing for rotation about an axis, a ring gear on the case and a drive pinion on the housing meshing with the ring gear to rotate the case, differential pinion gears meshing with the side gears and mounted on the case for rotation about axes transverse to said case axis, said case including an inner case portion disposed internally of the differential side and pinion gears and an external case portion disposed externally of the differential side and pinion gears, said inner and outer case portions extending into close running fit with the side and differential pinion gears in the regions adjacent the mesh points thereof to produce a pumping action, said outer case portion having a plurality of inlet passages therein communicating with the intertooth spaces at opposite sides of the mesh points of the side and differential pinion gears, inlet check valve means controlling flow through said inlet passages and operative to open for flow to the tooth spaces and to close to prevent return flow, said inner case portion having a chamber therein and a plurality of outlet passages communicating said chamber with the intertooth spaces at opposite sides of the mesh points of the side and differential pinion gears, outlet check valve means on said inner case portion controlling flow through said outlet passages operative to open for flow to the chamber and to close to prevent return flow, outlet passage means extending from said chamber to a point externally of the case for returning fluid to the reservoir, and flow control means in said outlet passage means for limiting flow from said chamber back to said reservoir to retard relative rotation of said differential side and pinion gears.

20. The combination of claim 19 wherein said differential case includes a pair of intermediate sections having opposed recesses for receiving the pinion gears and separable end sections, said inlet check valves being located adjacent the interface of said end sections and said intermediate sections.

21. In a differential mechanism including a differential housing defining an oil reservoir, a differential case mounted in the housing for rotation about an axis, a ring gear on the case and a drive pinion on the housing meshing with the ring gear to reversibly rotate the case, differential sun gears rotatably mounted in the case and differential planet gears rotatably mounted in the case and in mesh with the sun gears, said case including means extending into close running fit with the sun and planet gears in the region adjacent the mesh points thereof to produce a pumping action, the improvement comprising means defining a positive displacement feed pump having first and second oil intake scoops disposed adjacent the ring gear and respectively opening in directions opposite the forward and reverse directions of rotation of the ring gear, outlet passage means for feeding oil from said feed pump to the intertooth spaces in the sun and planet gears, said outlet passage means including an air separator means for removing air from the oil and for passing substantially air free oil to the sun and planet gears.

References Cited
UNITED STATES PATENTS

| | | | |
|---|---|---|---|
| 2,655,055 | 10/1953 | Bottcher | 74—711 |
| 2,722,140 | 11/1955 | Cabell | 74—711 |
| 2,734,398 | 2/1956 | Bottcher | 74—711 |
| 2,922,319 | 1/1960 | Burner | 74—711 |
| 3,145,583 | 8/1964 | Frentzel | 74—711 |
| 3,229,550 | 1/1966 | Nickell | 74—711 |

FRED C. MATTERN, Jr., *Primary Examiner,*

C. J. HUSAR, *Assistant Examiner,*